United States Patent
Ma et al.

(10) Patent No.: US 8,078,201 B2
(45) Date of Patent: Dec. 13, 2011

(54) METHOD AND SYSTEM FOR SHUNTING SHORT MESSAGES

(75) Inventors: Ningzhi Ma, Guangdong Province (CN); Jiaming Ma, Guangdong Province (CN); Chaodong Zhong, Guangdong Province (CN); Xuan Wang, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 740 days.

(21) Appl. No.: 11/662,418

(22) PCT Filed: Jun. 28, 2006

(86) PCT No.: PCT/CN2006/001483
§ 371 (c)(1),
(2), (4) Date: Mar. 9, 2007

(87) PCT Pub. No.: WO2007/012248
PCT Pub. Date: Feb. 1, 2007

(65) Prior Publication Data
US 2008/0014972 A1    Jan. 17, 2008

(30) Foreign Application Priority Data

Jul. 24, 2005   (CN) .......................... 2005 1 0036201

(51) Int. Cl.
*H04W 4/00* (2009.01)
(52) U.S. Cl. ...................................................... 455/466
(58) Field of Classification Search .......... 370/328–349, 370/496, 522; 455/466
See application file for complete search history.

(56) References Cited

U.S. PATENT DOCUMENTS

2003/0003932 A1* 1/2003 Corrigan et al. .............. 455/466

FOREIGN PATENT DOCUMENTS

| CN | 1453979 A1 | 11/2003 |
| CN | 1527618 A | 9/2004 |
| GB | 2387073 A * | 10/2003 |
| GB | 2399994 A * | 9/2004 |
| WO | WO 2006/006190 A2 | 8/2002 |
| WO | WO 2004/019628 A1 | 3/2004 |

OTHER PUBLICATIONS

International Search Report from PCT Application No. PCT/CN2006/001483.

* cited by examiner

*Primary Examiner* — Kent Chang
*Assistant Examiner* — Kashif Siddiqui

(57) ABSTRACT

A method for shunting short messages in a networking includes: receiving, by an FCC (Flow Control Center), short messages forwarded from a first device, when a second device can not receive the short messages from the first device; determining a flow path of the short messages; and forwarding the short messages via the flow path. Meanwhile, according to another embodiment of the present invention, there is disclosed a system for shunting short messages. According to the solution of the embodiments of the present invention, the shunting of short messages within the networking can be achieved, and further the shunting can be performed according to the operating information of each device in the networking.

7 Claims, 2 Drawing Sheets

METHOD AND SYSTEM FOR SHUNTING SHORT MESSAGES

FIELD OF THE INVENTION

The present invention relates to SMS (Short Message Service) in the field of communication, and particularly to a method and a system for shunting short messages.

BACKGROUND OF THE INVENTION

As a service point with independent functions, an SMS system generally accesses a PLMN (Public Land Mobile Network) via an STP (Signaling Transfer Point) to realize SMS application and provide carriers with short message service and its abundant value-added services.

Generally, a typical networking for SMS is as follows: an SMSC (Short Message Service Center) shields its interaction with a PLMN through a GIW (Gateway-Interworking), while the GIW accesses the PLMN via an STP. The networking for SMS may include a plurality of SMS systems, each of which includes an SMSC and a GIW. In the mobile network, the SMS systems are independent with each other and each SMS system has its own subscribers. Thus, once one of these systems fails, the SMS provided by it will be interrupted and become unavailable for its respective subscribers.

With the development of SMS and the popularization of mobile subscribers, the traffic of short messages increases accordingly, which presents higher requirement for disaster recovery backup and high reliability of an SMS system, requires the SMS system to have the capability of self-adaptation so as to react with the operating condition of the system and provide short message service uninterruptedly and stably as much as possible.

In view of the above situations, Chinese patent application publication No. CN 1453979A discloses an applicable technical solution in which individual SMS systems in a networking for SMS have backup relation with each other to compensate for the insufficiency of disaster recovery capability of a single system, thereby the reliability of SMS is improved.

FIG. 1 is a diagram showing the architecture of a networking for SMS disclosed in the patent application. As shown in FIG. 1, the networking includes three SMS systems, i.e. GIW1+SMSC1, GIW2+SMSC2 and GIW3+SMSC3, wherein the first and the second SMS systems are connected with each other so that backup relation exists between the two systems. If the GIW1 fails, an STP can transfer messages sent to the GIW1 originally to the GIW2; if the predetermined SMSC2 fails, the GIW2 can transfer messages to the SMSC1 to be processed so as to maintain uninterrupted operation of SMS.

Signaling level disaster recovery and system level disaster recovery of an SMS system can be achieved by the technical solution disclosed in the patent application. Taking the example of submitting short messages, put briefly, the flow path of the short messages is →STP→GIW→SMSC, and if the STP detects that the GIW of a certain SMS system fails, then it shunts the messages to the GIW of a backup SMS system by utilizing a global code address transforming function of the STP, thereby signaling level disaster recovery is achieved. The other is system level disaster recovery, for example, in FIG. 1, the SMSC2 is the backup SMSC of the SMSC1, if the GIW1 detects that the SMSC1 fails, then the GIW1 can shunt the messages to the SMSC2. The flow path of delivering short messages is →SMSC→GIW→STP, the processing of signaling level disaster recovery and system level disaster recovery based on the delivery of short messages is similar to that of submitting short messages, therefore the description thereof will be omitted.

But the shunting processing for short messages in the GIW/SMSC is excessively simple. The detailed analysis is as follows:

When short messages are shunted to other GIWs/SMSCs, all the message traffic can only be allocated uniformly regardless of the current load support condition of these GIWs/SMSCs. For example, in FIG. 1, when the GIW2 shunts short messages to the SMSC1, the load condition of the SMSC1 is not taken into consideration. Because the GIW2 is not connected with the SMSC3 in the networking and can not utilize the available processing capacity of the SMSC3 in the networking, the GIW2 can not adjust traffic allocation among individual SMSCs in the networking when shunting. Even if the GIW2 is connected with the SMSC3 and can shunt short messages to the SMSC3, how to balance the traffic allocation between the SMSC1 and the SMSC3, and how to consider the effect of the traffic from the GIW3 to the SMSC3, etc. are not mentioned in the solution.

Thus, the object of disaster recovery can be achieved only by establishing backup relation from the point of view of redundancy in the conventional SMS system, and only the established backup SMS system can be used for redundancy backup. Further, the traffic can not be adjusted according to the actual operating load of individual SMS systems in the current networking. Conventionally, messages are entirely transferred to a backup system regardless of the load of the backup system, which increases the possibility of impacting the backup system while achieving disaster recovery.

SUMMARY OF THE INVENTION

An embodiment of the present invention provides a system for shunting short messages, the system including:

a plurality of SMS (Short Message Service) systems, each of the plurality of SMS systems having a first device and a second device connected with the first device; and an FCC (Flow Control Center), connected with each of the plurality of first devices and the plurality of second devices, wherein the first device is configured to forward short messages to the FCC when the second device can not receive the short messages;

the FCC is configured to receive the short messages forwarded by the first device, determine a flow path of the short messages, and forward the short messages to one or more of the plurality of second devices via the determined flow path.

Preferredly, the plurality of first devices are SMSCs (Short Message Service Center) and the plurality of second devices are GIWs (Gateway-Interworking), or the plurality of first devices are GIWs and the plurality of second devices are SMSCs.

Preferredly, the FCC includes a communication means and a shunting means, wherein, the communication means is configured to receive the short messages sent by the first device, receive the flow path determined by the shunting means, and forward the received short messages via the flow path;

the shunting means is configured to receive the short messages sent by the communication means, determine the flow path of the short messages, and send the determined flow path to the communication means.

Preferredly, the FCC further includes a status detection means, each of the plurality of second devices is further configured to report its respective operating information to the communication means in the FCC;

the communication means is further configured to send the received operating information to the status detection means;

the status detection means is configured to receive the operating information of each of the plurality of second devices forwarded by the communication means, determine whether each of the plurality of second devices can shunt the short messages according to the operating information thereof, and then send an information of whether each of the plurality of second devices can shunt the short messages to the shunting means;

the shunting means is further configured to receive the information of whether the plurality of second devices can shunt the short messages which is sent by the status detection means, and then determine the flow path according to the information.

Preferredly, the first device in an SMS system are connected with the second device in another SMS system.

Another embodiment of the present invention provides a method for shunting short messages in a networking, the method including:

receiving, by an FCC (Flow Control Center), short messages forwarded from a first device, when a second device can not receive the short messages from the first device;

determining a flow path of the short messages; and forwarding the short messages via the flow path.

Preferredly, the first device is one of a plurality of first devices respectively included in a plurality of SMS (Short Message Service) systems, and the second device is one of a plurality of second devices respectively included in the plurality of SMS systems.

Preferredly, the plurality of first devices are SMSCs (Short Message Service Center) and the plurality of second devices are GIWs (Gateway-Interworking), or the plurality of first devices are GIWs and the plurality of second devices are SMSCs.

Preferredly, the first device determines that the second device can not receive the short messages when the connection from the first device to the second device is disconnected, or the second device indicates busy.

Preferredly, the process of determining a flow path of the short messages includes: selecting one or more destination devices from the other ones of the plurality of second devices, and taking paths from the FCC to the one or more destination devices as the flow path of the short messages.

Preferredly, a message type of the short messages is carried in the short messages sent to the FCC, and the message type includes one or more of alterable destination type, unalterable destination type and group sending type.

Preferredly, when the message type is the unalterable destination type, information of an unalterable destination device is carried in the short messages, and the process of determining a flow path of the short messages includes: obtaining the information of the unalterable destination device from the short messages, and taking the path from the FCC to the unalterable destination device as the flow path of the short messages.

Preferredly, when the message type is the alterable destination type, the process of determining a flow path of the short messages includes: selecting one or more destination devices from the other ones of the plurality of second devices, and taking the paths from the FCC to the selected destination devices as the flow path of the short messages.

Preferredly, when the message type is the group sending type, the process of determining a flow path of the short messages includes: determining the other ones of the plurality of second devices, and taking the paths from the FCC to all the determined second devices as the flow path of the short messages.

Preferredly, when the message type of the short messages sent to the FCC is the alterable destination type, the short messages carries a processing mode of the short messages, and the processing mode includes specified destination mode and unspecified destination mode.

Preferredly, before the FCC selects one or more destination devices from the other ones of the plurality of second devices, the method further includes:

determining whether the processing mode is carried in the short messages;

if the unspecified destination mode is carried, directly performing the process of selecting one or more destination devices;

if the specified destination mode is carried, carrying information about an specified destination device in the short messages;

obtaining the information about the specified destination device, and determining whether the specified destination device can shunt the short messages;

if the specified destination device can not shunt the short messages, performing the process of selecting one or more destination devices;

if the specified destination device can shunt the short messages, preferentially selecting the specified destination device, and when the specified destination device can not shunt the entire traffic of the short messages, performing the process of selecting one or more destination devices.

Preferredly, the method further includes:

setting a unique identification for each of the plurality of first devices and the plurality of second devices; and sending the identification of the second device to the FCC through the short messages by the first device, wherein the process of selecting one or more destination devices from the other ones of the plurality of second devices includes: obtaining the identification of the second device from the short messages, determining the type of the second device corresponding to the identification, and determining other second devices with the same type of the second device in the networking according to the identification, and selecting one or more destination devices from the other second devices.

Preferredly, the method further includes: authenticating each of the plurality of first devices and the plurality of second devices when each of the plurality of first devices and the plurality of second devices accesses the FCC.

Preferredly, the method further includes: reporting a respective operating information to the FCC by each of the plurality of second devices;

after the FCC determines that the message type of the short messages is alterable destination, selects one or more destination devices from the other ones of the plurality of second devices, and takes the paths from the FCC to the selected destination devices as the flow path of the short messages, and before the short messages are sent via the flow paths, the method further includes:

determining short message traffic allocated to each of the selected destination devices according to operating information of each of the selected destination devices, and sending the short messages on the respective flow paths according to the determined short message traffic.

Preferredly, the operating information includes maximum load capacity and remaining load capacity, and wherein the process of determining short message traffic allocated to each of the selected destination devices according to operating information of each of the selected destination devices includes:

calculating the sum of the remaining load capacity of all the selected destination devices, and calculating the sum of the short message traffic required to be shunted in all the selected destination devices;

if the sum of the remaining load capacity is greater than the sum of the short message traffic, and allocating the short messages to each of the selected destination devices uniformly or in proportion to the remaining load capacity of each destination device;

otherwise, allocating the short message traffic equal to the sum of the remaining load capacity to all the selected destination devices uniformly or in proportion to the remaining load capacity of each destination device, and allocating the remaining short message traffic after the above allocation to all the selected destination devices according to the maximum load capacity of all the selected destination devices, or uniformly.

Preferredly, the method further includes: reporting a respective operating information including availability status to the FCC by each of the plurality of second devices, wherein the process of selecting one or more destination devices from the other ones of the plurality of second devices includes: obtaining the operating information of each of the other second devices, and determining whether the current availability status of each of the other second devices is 'available', if yes, selecting the destination device; otherwise, not selecting the destination device.

In the solution provided by the embodiments of the present invention, the FCC is added in an existing networking, and short messages required to be forwarded in each device are shunted and forwarded through the FCC. The shunting method can be employed to adjust traffic distribution according to the load and operating condition of each device in the system, perform shunting processing for the messages, thus the stability, reliability and disaster recovery capability of each SMS system in the entire networking can be improved.

BRIEF DESCRIPTIONS OF THE DRAWINGS

DETAILED DESCRIPTIONS

Some embodiments of the present invention add an FCC in an existing networking for SMS which is called a short message shunting system, and devices in each SMS system in the short message shunting system, i.e., an SMSC and a GIW, are both connected with the FCC. When a certain SMSC in the short message shunting system fails, the GIW corresponding to the SMSC converges messages sent to the SMSC originally to the FCC. Similarly, when a certain GIW can not receive short messages due to some reason, the SMSC corresponding to the GIW converges the messages sent to the GIW originally to the FCC. Then, the FCC determines flow paths of the received short messages, and shunts and forwards the short messages via the determined flow paths.

In addition, in the above short message shunting system, the SMSC in each SMS system may also be connected with the GIWs in other SMS systems. Similarly, the GIW may also be connected with the SMSCs in other SMS systems. With respect to the connection relation, when the FCC is required to forward messages, the FCC also determines the flow paths, and shunts and forwards the messages.

With respect to the above two kinds of networking, though the connection relations between the GIWs and the SMSCs are different to some extent, the processing of determining the flow paths and forwarding the messages by the FCC is same.

With a method for shunting short messages according to an embodiment of the present invention, two functions may be mainly achieved: 1. redundant path function, the function is mainly achieved by the FCC selecting flow paths for short messages currently required to be forwarded; 2. intelligent shunting function, the function is mainly achieved by the FCC shunting and forwarding short messages in the selected flow paths according to the load condition of each device in the current short message shunting system.

The present invention will be further described with reference to the accompanying drawings and embodiments in order to better understand the present invention.

Figure 1:
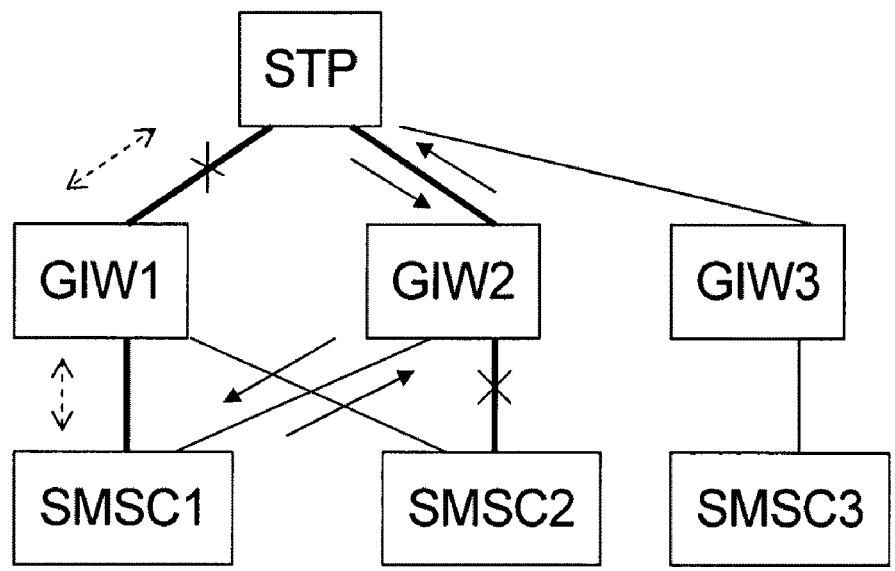
FIG. 1 is an architecture diagram of an conventional SMS system.
Figure 2:
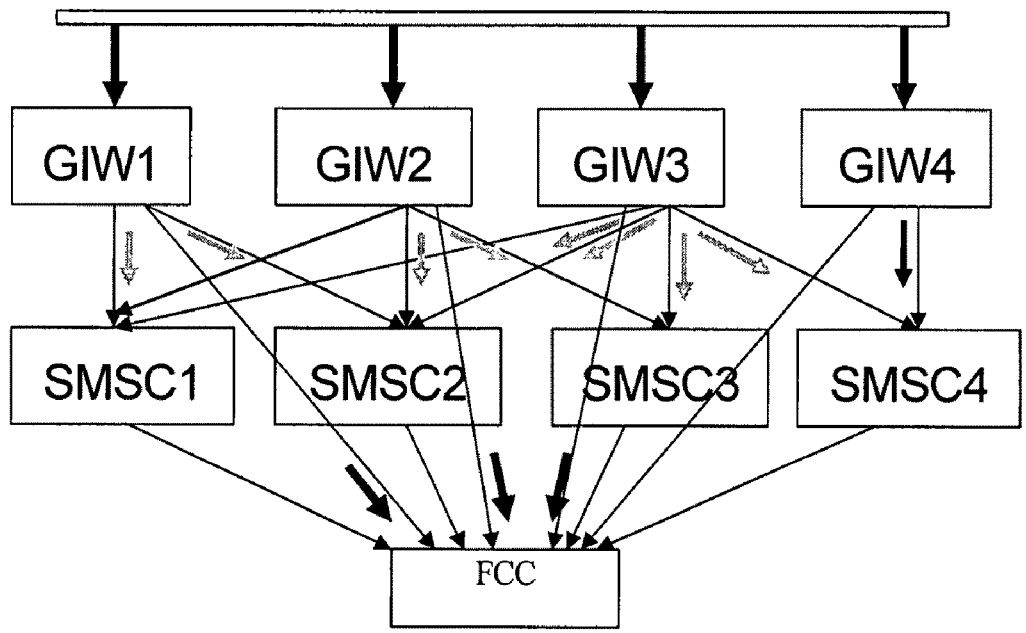
FIG. 2 is an architecture diagram of a short message shunting system according to an embodiment of the present invention.

FIG. 2 is an architecture diagram of a short message shunting system according to an embodiment of the present invention. The short message shunting system includes four SMS systems each having two devices, i.e., an SMSC and a GIW. In particular, the four SMS systems are SMSC1+GIW1, SMSC2+GIW2, SMSC3+GIW3 and SMSC4+GIW4 respectively, wherein the SMSC and the GIW in each SMS system should be connected. The SMSC in an SMS system may also be connected with the GIWs in other SMS systems. Similarly, the GIW may be connected with the SMSCs in other SMS systems. As shown in FIG. 2, the GIW2 is connected with the SMSC1, the SMSC2 and the SMSC3 respectively, and the SMSC1 is connected with the GIW1 and the GIW2 respectively. Meanwhile, an FCC is included in the short message shunting system according to an embodiment of the present invention, and the FCC is connected with all the SMSCs and GIWs in the short message shunting system. When forwarding short messages, an SMSC may take the FCC as a GIW and forward short messages to the FCC. Similarly, a GIW may take the FCC as an SMSC and forward short messages to the SMSC. The FCC serves as a forwarding point.

Because the shunting processing for the short messages from the SMSC by the FCC is same as that from the GIW, only the shunting processing for the short messages from the GIW1 in FIG. 2 by the FCC is taken as an example hereinafter.

1. The Implementation of Redundant Path Function:

As shown in FIG. 2, the SMSCs and the GIWs in all the SMS systems are connected to the FCC, and thus a redundant path: →STP→GIW→FCC→SMSC may be added to submitting paths of uplink short messages on the basis of an original path: →STP→GIW →SMSC. Similarly, a redundant path: →SMSC→FCC→GIW→STP may be added to sending paths of downlink short messages on the basis of an original path: →SMSC→GIW→STP.

Taking the example of uplink sending short messages by the GIW1, in normal cases, assuming that the GIW1 uplink sends short messages via a path: →STP→GIW1→SMSC1, that is, the GIW1 directly sends the short messages to a peer device of the path, i.e., the SMSC1, if the SMSC1 can not process the short messages due to various reasons, the uplink short messages may be sent via a redundant path, such as →STP→GIW1→FCC→SMSC2,
→STP→GIW1→FCC→SMSC3, or
→STP→GIW1→FCC→SMSC4. Of course, the uplink short messages may also be sent simultaneously via any two or three of the three redundant paths. That is, the GIW1 firstly forwards the short messages to the FCC, then the FCC selects a flow paths of the short messages, which should be the paths from the FCC to SMSCs other than the SMSC1 in the networking. As described above, the paths may be one or more paths, because the FCC may select one or more SMSCs from the other SMSCs, or select all the SMSCs other than the SMSC1. Then, the FCC may send the short messages to the SMSCs other than the SMSC1 via the selected flow paths.

For the short message shunting system, the reason of triggering the shunting by individual devices may substantially be summed up as follows:

a. the connection between a GIW and an SMSC is disconnected;

b. an SMSC indicates busy, i.e., indicates the load is too heavy;

c. a GIW indicates busy, i.e., indicates the load is too heavy.

Therefore, if the connection from a GIW to an SMSC is disconnected, the GIW sends the messages originally sent to the SMSC to the FCC, and the FCC shunts and forwards the messages. Similarly, if the connection from an SMSC to a GIW is disconnected, the SMSC sends the messages sent to the GIW originally to the FCC, and the FCC shunts and forwards the messages.

If an SMSC indicates busy, all the GIWs connected with the SMSC send the messages to the FCC, and the FCC shunts and forwards the messages. Similarly, if a GIW indicates busy, all the SMSCs connected with the GIW send the short messages to the FCC, and the FCC shunts and forwards the messages.

In addition, as described above, after receiving the short messages, the FCC should determine flow paths for the short messages, then shunts and forwards the short messages via the flow paths. In order to facilitate the determination of the flow paths for the short messages by the FCC, a respective unique identification may be set for each device connected with the FCC in the short message shunting system. When the device in the short message shunting system forwards the short messages required to be shunted to the FCC, the device sets the identification information of the original destination of the short messages in the short messages. When selecting the flow paths, the FCC may determine the type of a device corresponding to the identification, and determine other devices with the same type of the device corresponding to the identification in the networking according to the identification, and then determine the flow paths by selecting one or more devices from the determined other devices. In order to assure uniqueness and correctness for the identification of each device, the identification of the device may be authenticated by the FCC when the device is connected with the FCC.

In addition, the short messages required to be forwarded may now be classified into three types: group sending message, message with unalterable destination, and message with alterable destination. Therefore, the GIW and the SMSC in the short message shunting system may indicate message type of short messages they send to the FCC. Specifically, the message type of the short messages may be sent to the FCC through the short messages. The solutions for setting the flow paths for the three types of short messages by the FCC will be described below with reference to the example that the GIW1 is required to forward short messages to the FCC when it can not send the short messages to the SMSC1.

If the GIW1 indicates that the short messages forwarded to the FCC are messages with alterable destination, the FCC may take the paths from the FCC to any one or more of the SMSCs other than the SMSC1 in the short message shunting system as the flow paths, or may also take the paths from the FCC to all the SMSCs other than the SMSC1 as the flow paths;

If the GIW1 indicates that the short messages forwarded to the FCC are group sending messages, the FCC directly takes the paths from the FCC to all the SMSCs other than the SMSC1 as the flow paths when forwarding the messages;

If the GIW1 indicates that the short messages forwarded to the FCC are messages with unalterable destination, then the GIW1 is required to provide information about the device of the unalterable destination, i.e., information about a specific SMSC, and then the FCC is required to forward the short messages to the specific SMSC, i.e., take the path to the specific SMSC as the flow path.

The above redundant path function provides the solution for selecting the flow paths by the FCC. With respect to short messages with alterable destination, the FCC may process the short messages according to the processing mode of the short messages which is set by the GIW1.

For example, if the GIW1 indicates that the type of the short messages is alterable destination type, the GIW1 may also send the processing mode of the short messages through the short messages. The processing mode may include specified destination mode and unspecified destination mode, and when the GIW1 determines that the processing mode is the specified destination mode, information about the device of the specified destination should be carried in the short messages. In this case, before selecting one or more SMSCs, the FCC is required to determine whether the processing mode of the short messages is carried in the short messages. If the unspecified destination mode is carried, the FCC directly selects one or more SMSCs; if the specified destination mode is carried, the FCC obtains the information about the corresponding destination device, i.e. a certain SMSC, and determines whether the SMSC can shunt the short messages. If no, the FCC selects one or more SMSCs; if yes, the FCC preferentially selects the SMSC, and when the SMSC can not shunt the entire traffic of the short messages, the FCC selects one or more SMSCs to shunt the short messages.

The FCC can shunt and forward the short messages via the previously determined flow paths according to the operating condition and load condition of each device in the short message shunting system, and a particular solution is achieved by the following intelligent shunting function.

2. The Implementation of Intelligent Shunting Function

All the SMSCs and the GIWs connected with the FCC in the entire system should periodically report their own operating information to the FCC. Of course, when all the devices operate normally, the SMSCs and the GIWs just report their own operating information, and the short messages are transmitted via the normal path, and need not be sent to the FCC. When shunting is needed, the SMSCs and the GIWs send the short messages required to be shunted to the FCC. If the messages are messages with alterable destination, the FCC may determine the most reasonable and most effective shunting and forwarding way from the determined flow paths according to the operating information periodically reported by the SMSCs and the GIWs, and then shunt and forward the messages.

In the processing, the operating information reported by the SMSCs and the GIWs to the FCC is determined by analyzing. The operating information may include load information and operating condition information. The function of the SMSC mainly is storing and scheduling of short messages, and its load status is not only dependent on load capacity, for example, the short messages should be stored and wait for next scheduling when the delivery of the short messages fails, this also results in part of the load of the SMSC, thus the load information can not be summarized only depending on the remaining load capacity. With respect to the GIW, its load information may be directly reflected by current remaining load capacity, but its unique feature is that it may detect whether the signaling link to the STP is available, if the signaling link fails, this indicates that the GIW can not process the messages. Therefore, the operating information of the SMSC may include maximum load message capacity, remaining load capacity and availability status, wherein the availability status indicates busy or idle status of the SMSC; the operating information of the GIW may include maximum load message capacity, remaining load capacity and availability status.

If the availability status is included in the operating information reported to the FCC by each device in the networking, when the FCC selects one or more devices, it may make this selection according to the availability status of individual devices. Specifically, the FCC need obtain the operating information of each of the other devices, and determine whether the availability status of the device is 'available', if yes, the FCC selects the device; otherwise, the FCC does not select the device. If the FCC has not received availability status information of a certain device for a certain period, the FCC may consider that the current availability status of the device is 'unavailable'.

In addition, when the FCC receives short messages sent by a certain device, if the FCC determines that the short messages are messages with alterable destination and selects a plurality of devices for forwarding the short messages, it may determine short message traffic allocated to the selected devices according to the operating information of the devices, then shunts and forwards the short messages according to the determined short message traffic.

If the operating information reported by each device includes the maximum load capacity and the remaining load capacity, the FCC may calculate the sum of the remaining processing capacity of each SMSC which may shunt the short messages, i.e., Σremaining capacity. The Σremaining capacity is the sum of the remaining load capacity of each SMSC at present. Also, the FCC may calculate the sum of short message traffic required to be shunted by these devices, and then compare the two calculation results.

If the Σremaining capacity is greater than or equal to the sum of short message traffic, the traffic shunted to each SMSC is calculated proportionally. For example, the short messages may be allocated to each SMSC uniformly; alternatively, the traffic to be shunted to each SMSC may also be calculated in proportion to the processing capacity of each SMSC, so as to be forwarded.

If the Σremaining capacity is less than the sum of short message traffic, the short message traffic equal to the Σremaining capacity is allocated to each SMSC proportionally. For example, the traffic may be allocated uniformly or according to the remaining processing capacity of each SMSC, so as to obtain the traffic shunted to each SMSC. After this allocation, there is remaining short message traffic, which may be allocated to each SMSC in proportion to the maximum processing capacity of all the SMSCs which can shunt the short messages, so as to obtain the traffic shunted to each SMSC. Of course, the remaining short message traffic may be allocated uniformly.

In addition, as described above, if the type of short messages sent to FCC by the GIW1 is alterable destination type, the GIW1 may further specify a specific processing mode of the short messages as required, for example, it may specify that the processing mode of the short messages is specified destination mode or unspecified destination mode.

If the processing mode of the short messages is unspecified destination mode, the FCC may directly perform the above allocation. If the processing mode of the short messages is specified destination mode, the FCC may perform the follow processing:

The FCC obtains information about the device of the specified destination, such as identification etc., and determines whether the destination device may shunt the short messages. If no, the FCC also performs the above processing; if yes, the FCC preferentially sends the short messages to the destination device. Preferentially sending the short messages to the destination device may include: obtaining remaining processing capacity of the destination device, i.e., remaining load capacity, if the remaining processing capacity suffices to forward the short messages, directly forwarding the short messages to the destination device, otherwise, forwarding the short messages according to the remaining processing capacity, and shunting and forwarding the remaining short messages according to the above processing.

Figure 3:
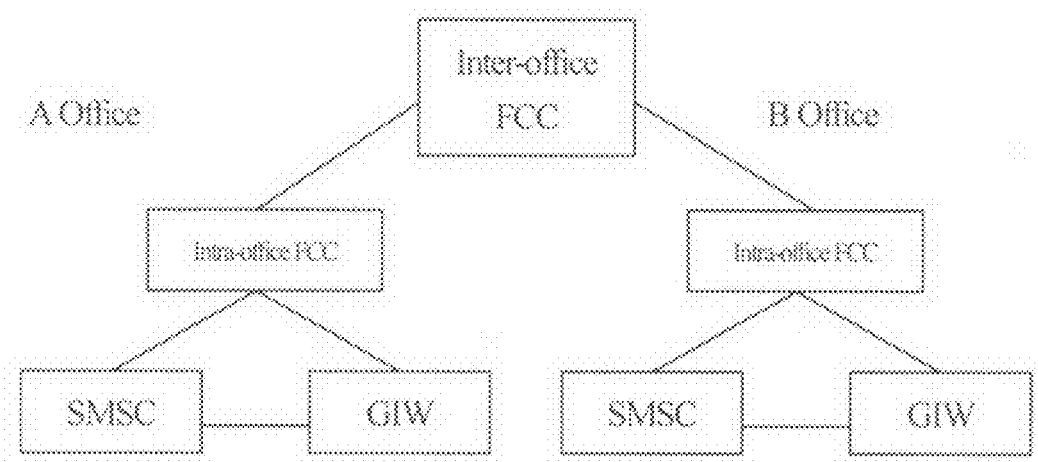
FIG. 3 is a schematic architecture diagram of arranging an inter-office FCC on the basis of the system shown in FIG. 2 according to an embodiment of the present invention.

In addition, the FCC is arranged in a networking to deal with the shunting and forwarding of short messages in the networking. The networking is called an office, thus each office corresponds to a short message shunting system according to the embodiment of the present invention, and generally there are a plurality of SMS systems in each office. In some cases, there may be the problem that all the SMS systems in a certain office can not deal with the shunting and forwarding of short messages in the office at present. In such cases, an inter-office FCC may be arranged, which is connected with FCCs in a plurality of offices, i.e., intra-office FCCs, and the connection relation is shown in FIG. 3. Each intra-office FCC sends operating information of each device in each SMS system in the office to the inter-office FCC. Thus, if a certain intra-office FCC determines that the shunting and forwarding of short messages in the office can not be dealt with in the office, the short messages may be forwarded to the inter-office FCC, and then the inter-office FCC selects another office to shunt and forward the short messages. For example, the inter-office FCC may determine which office is relatively idle according to operating information reported by each intra-office FCC, and thus forwards the received short messages to the intra-office FCC of the idle office. Then, the intra-office FCC of the idle office shunts and forwards the short messages. The shunting and forwarding processing performed by the intra-office FCC receiving the short messages is the same as that of the FCC in the networking as described above.

As can be seen from the above description, the short message shunting system provided by the solution of the embodiment of the present invention includes an FCC. Each device in the SMS system sends short messages to the FCC when a peer device of the short message path can not receive the short messages, and receives short messages forwarded by the FCC. If the device required to forward the short messages to the FCC is a GIW, the short message path is a short message submitting path; if the device required to forward the short messages to the FCC is an SMSC, the short message path is a short message sending path. The FCC is mainly configured to receive short messages forwarded by each device in the short message shunting system, then determine a flow path of the short messages, and shunt and forward the short messages via the determined flow path.

Specifically, the FCC may include two means, i.e., a communication means and a shunting means, and the above shunting processing is achieved by the two means.

The communication means is configured to communicate with each device in the short message shunting system, i.e., communicate with the SMSCs and the GIWs in the short message shunting system. For example, the communication means receives short messages forwarded by each device and then sends the short messages to the shunting means, and receives a flow path determined by the shunting means and then forwards the short messages via the flow path.

The shunting means is configured to receive the short messages sent by the communication means, determine a flow path of the short messages, and send the determined flow path to the communication means. Various particular implementations for determining the flow path of the short messages by the shunting means have been discussed as above, and thus the description thereof will be omitted here.

The shunting and forwarding of short messages by the FCC may be achieved by the two means.

Figure 4:
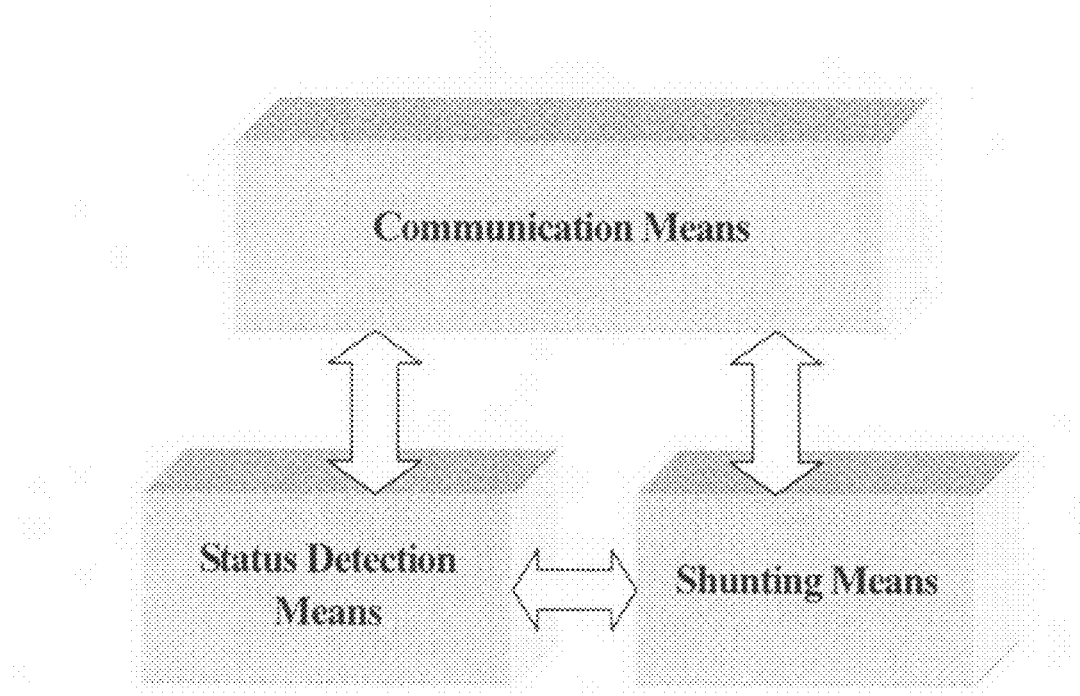
FIG. 4 is a schematic diagram of internal structure of an FCC according to an embodiment of the present invention.

In addition, the devices such as the SMSCs and the GIWs in the short message shunting system may further report their respective operating information to the FCC. In such case, a status detection means may be added in the FCC as shown in FIG. 4. Correspondingly, the communication means is required to receive the operating information of the SMSCs and the GIWs and send the operating information to the status detection means. The status detection means is configured to detect the operating information of the SMSCs and the GIWs, determine whether the devices can shunt the short messages according to their respective operating information at present, and then send the information of whether each device can shunt the short messages to the shunting means. Then, the shunting means may determine the flow path of the short messages according to the information of whether each device can shunt the short messages.

Further, after the status detection means has not received the operating information of a certain device for a set period, it may determine that the device can not shunt the short messages at present, and then send the information that the device can not shunt the short messages to the shunting means. The above description is only preferred embodiments of the present invention, and it is not intended to limit the present invention. Various modifications, equivalent substitutions, improvements etc. within the spirit and principle of the present invention should fall into the protection scope of the present invention.

What is claimed is:

1. A system for shunting short messages, comprising:
   a plurality of Short Message Service (SMS) systems, each of the plurality of SMS systems having a first device and a second device connected with the first device; and
   an Flow Control Center (FCC), connected with each of the plurality of first devices and the plurality of second devices, wherein
   one of the first devices is configured to forward a short message to its corresponding second device without passing through the FCC;
   the first device is configured to forward a short message, which originally should be sent to the second device without passing through the FCC, to the FCC if the connection between the first device and its corresponding second device is disconnected or the second device indicates busy;
   the FCC is configured to receive the short message forwarded by the first device, determine a flow path of the received short message, and forward the received short message to one or more of the plurality of second devices via the determined flow path.

2. The system of claim 1, wherein the plurality of first devices are Short Message Service Center (SMSCs) and the plurality of second devices are Gateway-Interworking (GIWs), or the plurality of first devices are GIWs and the plurality of second devices are SMSCs, wherein the SMSCs are connected with a Public Land Mobile Network (PLMN) through a GIW and a Signal Transfer Point (STP).

3. The system of claim 1, wherein the FCC comprises a communication means and a shunting means, wherein,
   the communication means is configured to receive the short messages sent by the first device, receive the flow path determined by the shunting means, and forward the received short messages via the flow path;
   the shunting means is configured to receive the short messages sent by the communication means, determine the flow path of the short messages, and send the determined flow path to the communication means.

4. The system of claim 3, wherein the FCC further comprises a status detection means,
   each of the plurality of second devices is further configured to report its respective operating information to the communication means;
   the communication means is further configured to send the operating information to the status detection means;
   the status detection means is configured to receive the operating information of each of the plurality of second devices forwarded by the communication means, determine whether each of the plurality of second devices can shunt the short messages according to the operating information thereof, and then send information of whether each of the plurality of second devices can shunt the short messages to the shunting means;
   the shunting means is further configured to receive the information of whether the plurality of second devices can shunt the short messages which is sent by the status detection means, and then determine the flow path according to the information.

5. The system of claim 1, wherein the first device in an SMS system is connected with the second device in another SMS system.

6. A system for shunting short messages, the system comprising:
   a plurality of Short Message Service (SMS) systems, each of the plurality of SMS systems having a first device, a second device, and a current short message path therebetween for communicating short messages between the first device and the second device;
   a Flow Control Center (FCC) connected with each one of the plurality of first devices and the plurality of second devices;
   wherein when one of the plurality of second devices cannot receive a short message from its corresponding first device because the current short message path therebetween is disconnected or the second device is busy, the one second device forwards the short message to the FCC, and the FCC is configured to receive the short message, determine a flow path of the received short message and forward the received short message to another second device via the determined flow path.

7. A method for shunting short messages in a network, the network including a plurality of Short Message Service (SMS) systems, each of the plurality of SMS systems having a first device, a second device, and a current short message path therebetween for communicating short messages between the first device and the second device, and the network includes a Flow Control Center (FCC) communicatively coupled to each of the first devices and each of the second devices, the method comprising:

forwarding short messages from one of the first devices to its corresponding second device via the corresponding current short message path without passing through the FCC;

when the corresponding short message path is disconnected or the corresponding second device is busy, forwarding a second short message from the first device to the FCC;

determining a flow path of the second short message from the FCC to another second device; and forwarding the second short message via the flow path to the other second device.

* * * * *